(12) United States Patent
Hoffmann et al.

(10) Patent No.: US 11,872,972 B2
(45) Date of Patent: Jan. 16, 2024

(54) METHOD AND CONTROL DEVICE FOR SETTING A WORKING POINT OF A SLIP CONTROLLER FOR A WHEEL OF A VEHICLE

(71) Applicant: Robert Bosch GmbH, Stuttgart (DE)

(72) Inventors: Kai Hoffmann, Ilsfeld (DE); Marco Stumm, Ludwigsburg (DE); Michael Erden, Bietigheim-Bissingen (DE); Rami Scharbak, Benningen (DE); Valentin Loeffelmann, Dielheim (DE); Dirk Weidmann, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/917,499

(22) PCT Filed: Aug. 3, 2021

(86) PCT No.: PCT/EP2021/071605
§ 371 (c)(1),
(2) Date: Oct. 6, 2022

(87) PCT Pub. No.: WO2022/073670
PCT Pub. Date: Apr. 14, 2022

(65) Prior Publication Data
US 2023/0150463 A1 May 18, 2023

(30) Foreign Application Priority Data
Oct. 5, 2020 (DE) ...................... 10 2020 212 544.9

(51) Int. Cl.
*B60T 8/17* (2006.01)
*B60T 8/1761* (2006.01)
*B60T 8/175* (2006.01)

(52) U.S. Cl.
CPC .......... *B60T 8/17616* (2013.01); *B60T 8/175* (2013.01); *B60T 2240/00* (2013.01); *B60T 2270/211* (2013.01)

(58) Field of Classification Search
CPC .. B60T 8/17616; B60T 8/175; B60T 2240/00; B60T 2270/211
(Continued)

(56) References Cited

U.S. PATENT DOCUMENTS

2020/0070809 A1\* 3/2020 Alcantar ................ B60K 28/16
2021/0394727 A1\* 12/2021 Lee ......................... B60L 3/102

FOREIGN PATENT DOCUMENTS

DE        3929497 A1    3/1991
DE        4017889 C1    10/1991
(Continued)

OTHER PUBLICATIONS

English Translation for DE10006012A1 (Year: 2023).\*
(Continued)

*Primary Examiner* — Mahmoud S Ismail
(74) *Attorney, Agent, or Firm* — NORTON ROSE FULBRIGHT US LLP

(57) ABSTRACT

A method for setting a working point of a slip controller for a wheel of a vehicle. Upon activating the slip controller, a torque at the wheel is controlled on the basis of the working point using a slip at the wheel, wherein the torque is monitored and a value of the working point is set to a previous value of the torque if the slip satisfies a condition.

8 Claims, 3 Drawing Sheets

(58) Field of Classification Search
USPC .......................................................... 701/70
See application file for complete search history.

(56) References Cited

FOREIGN PATENT DOCUMENTS

| | | | | |
|---|---|---|---|---|
| DE | 4333281 | A1 | 3/1995 | |
| DE | 10006012 | A1 * | 9/2000 | ......... B60G 17/0195 |
| DE | 10006012 | A1 | 9/2000 | |
| FR | 2924392 | A3 | 6/2009 | |
| WO | 9508451 | A1 | 3/1995 | |
| WO | WO-9508451 | A1 * | 3/1995 | ................ B60L 3/10 |

OTHER PUBLICATIONS

English Translation for WO9508451A1 (Year: 2023).*
International Search Report for PCT/EP2021/071605, dated Oct. 15, 2021.

* cited by examiner

METHOD AND CONTROL DEVICE FOR SETTING A WORKING POINT OF A SLIP CONTROLLER FOR A WHEEL OF A VEHICLE

FIELD

The present invention relates to a method for setting a working point of a slip controller for a wheel of a vehicle and to a corresponding control device.

BACKGROUND INFORMATION

Slip controllers can be designed as brake slip controllers or drive slip controllers. A brake slip controller can be part of an anti-lock braking system (ABS) and can then also be referred to as an anti-lock control (ALC). A drive slip controller can be part of a traction control system (TCS). While the controller is active, an estimated optimal pressure for a best possible deceleration or acceleration is referred to as the working point.

A brake slip controller of a vehicle becomes active if at least one wheel of the vehicle begins to lock. A working point for the controller is conventionally a brake pressure which is operated or demanded by a driver at the time of activation of the brake slip controller. A first value of the working point can be referred to as a starting point. After activation, the wheel is first stabilized by greatly reducing the brake pressure. When the wheel is stabilized, the brake pressure is increased in small steps, wherein the working point is a control target of the brake slip controller.

A drive slip controller of a vehicle becomes active when at least one wheel of the vehicle begins to spin. A working point for the control is conventionally a drive torque which is operated or demanded by a driver at the time of activation of the drive slip controller. A first value of the working point can be referred to as a starting point. After activation, the wheel is first stabilized by greatly reducing the drive torque. When the wheel is stabilized, the drive torque is increased in small steps, wherein the working point is a control target of the drive slip controller.

SUMMARY

The present invention provides a method for setting a working point of a slip controller for a wheel of a vehicle and a corresponding control device, a corresponding computer program product, and a machine-readable storage medium. Advantageous developments and improvements of the present invention emerge from the disclosure herein.

Example embodiments of the present invention can advantageously enable a working point of a slip controller to be preset with at least one large step and to then be optimized in small steps. The described setting of the working point can enable a rapid and/or precise control of braking torques or drive torques.

According to an example embodiment to the present invention, a method is provided for setting a working point of a slip controller for a wheel of a vehicle, wherein the activated slip controller controls a torque brought about at the wheel on the basis of the working point, taking into account a currently measured slip between the wheel and a ground, wherein before and/or during activation of the slip controller, the torque is repeatedly monitored and a value of the working point is set to a temporally previous value of the torque if the slip satisfies a predetermined condition.

Ideas for embodiments of the present invention may be considered, inter alia, as being based on the concepts and findings described below.

If a wheel rolls over a ground and, in so doing, a force in or against a rolling direction is transmitted to the ground, slip occurs between the wheel and the ground. The force is proportional to a torque acting on the wheel. The slip increases with increasing torque. The transmittable torque here has a maximum from which the slip continues to increase, but the torque decreases greatly. If the maximum of the torque is exceeded, the wheel starts to slip. During braking, the wheel starts to lock, and during acceleration, the wheel starts to spin. The maximum torque depends on current environmental conditions. The environmental conditions influence the wheel and the ground. The complex interplay of the environmental influences makes it impossible to calculate the optimal torque.

A brake slip controller controls a brake pressure at a brake mechanically coupled to the wheel, such that the slip remains below a value at which the maximum possible torque can be transmitted from the wheel to the ground. The torque at the wheel is proportional to the brake pressure. An estimated value for a brake pressure required for transmitting the maximum possible torque can be referred to as a working point of the brake slip controller since the brake pressure actually required therefor is not known and can only be approximated. The brake slip controller can increase the brake pressure, maintain the brake pressure, or lower the brake pressure so that the wheel does not slip.

A drive slip controller controls a drive torque such that the slip remains below a value at which the maximum possible drive torque can be transmitted from the wheel to the ground. An estimated value for the maximum possible drive torque can be referred to as a working point of the drive slip controller since the actually transmittable drive torque is not known and can only be approximated. The drive slip controller can increase the drive torque, maintain the drive torque, or lower the drive torque so that the wheel does not slip.

The slip controller can be activated if, for example, a driver of the vehicle builds up an excessively strong brake pressure via a brake pedal of the vehicle or wants to accelerate too strongly via an accelerator pedal of the vehicle. The slip controller outputs a torque target value for the torque. The torque target value is converted in the brake system of the vehicle into the hydraulic brake pressure and/or in a drive system of the vehicle into a drive torque. The torque target value is then independent of the respectively actuated pedal.

The slip controller can be inactive if the slip is less than a limit value. When the slip controller is activated, the working point is referred to as the starting point of the slip controller.

During monitoring, a time curve of the torque, i.e., of the drive torque or of the braking torque, can be recorded. Values of the torque can also be stored at predetermined intervals. When setting the working point or the starting point, one of the recorded or stored values can be used as the new working point or starting point.

The approach presented here in accordance with the present invention can be used both when the slip controller is active and when the slip controller is inactive. When the slip controller is inactive, the starting point is revised in the process. When the slip controller is active, the working point is revised.

According to an example embodiment of the present invention, the value of the working point can be set to the previous value of the torque, i.e., to a value set at an earlier time, if an inflection point from a negative to a positive gradient of a curve of the slip is detected. The working point can be set to a temporally previous value of the torque from before a dead time of the brake system or of the drive system. The slip increases at an inflection point from a negative gradient to a positive gradient. However, the brake system and the drive system cannot respond without delay. By the time the brake system and/or drive system has responded, the slip will have already left a target range or be moving away from the maximum torque. The working point can therefore be set to the previous torque at which the slip was still effective.

According to an example embodiment of the present invention, the value of the working point can be set to the previous value of the torque if the slip is greater than a limit value. The limit value can be predetermined, for example, by experiments, calculations, prior experiences, or the like and can be stored in the slip controller. If the slip is greater than 7%, the working point can be set, for example, to the previous value at which an effective torque could be transmitted. The working point can be reset again if the slip becomes greater than 13.5%, 17.5%, and 23%. Furthermore, the working point is taken into account when setting the torque. The working point specifies a target value, up to which the torque can be adjusted quickly, and prevents the optimal value from being exceeded or undershot.

The value of the brake pressure may be detected if the slip is within a target slip range and a positive or negative acceleration of the vehicle is within a target acceleration range. The value can be detected if the slip and the acceleration are as desired.

According to an example embodiment of the present invention, the value of the working point can be increased by a predefined increment if the slip is within a target slip range, the torque is above the working point, and an inflection point from a positive to a negative gradient of a curve of the slip is detected. If the torque actually applied to the wheel is above the working point and the slip nevertheless begins to fall, the working point is too low. An increment can be a larger step in order to be able to change the working point quickly.

According to an example embodiment of the present invention, a gradient of the torque can be set proportionally to the working point. The higher the working point is, the more strongly the torque can be changed. Conversely, the lower the working point is, the less strongly the torque can be changed. A high working point results when the road conditions are good, i.e., nonslip. A low working point results when the road conditions are poor, i.e., slippery.

The value of the working point can be increased by a predefined increment and the torque can be kept constant for a period of time if the torque is above the working point and a gradient of the slip is negative. If the actual torque is already above the working point and the slip nevertheless falls, the working point is too low.

The method according to the present invention can be implemented, for example, in software or hardware or in a mixed form of software and hardware, for example in a control device.

The present invention furthermore provides a control device which is designed to carry out, actuate, or implement in corresponding devices the steps of a variant of the method disclosed herein in accordance with the present invention.

The control device can be an electrical device with at least one computing unit for processing signals or data, at least one memory unit for storing signals or data, and at least one interface and/or one communication interface for reading in or outputting data embedded in a communication protocol. The computing unit can, for example, be a signal processor, a so-called system ASIC, or a microcontroller for processing sensor signals and outputting data signals on the basis of the sensor signals. The memory unit can, for example, be a flash memory, an EPROM, or a magnetic memory unit. The interface can be designed as a sensor interface for reading in the sensor signals from a sensor and/or as an actuator interface for outputting the data signals and/or control signals to an actuator. The communication interface can be designed to read in or output the data in a wireless and/or wired manner. The interfaces may also be software modules that are present, for example, on a microcontroller in addition to other software modules.

A computer program product or a computer program with program code that can be stored on a machine-readable carrier or storage medium, such as a semiconductor memory, a hard disk memory, or an optical memory, and that is used for carrying out, implementing, and/or controlling the steps of the method according to one of the embodiments described above is advantageous as well, in particular when the program product or program is executed on a computer or an apparatus.

It is pointed out that some of the possible features and advantages of the present invention are described herein with reference to different embodiments. A person skilled in the art recognizes that the features of the control device and of the method can be suitably combined, adapted, or replaced in order to arrive at further embodiments of the present invention.

BRIEF DESCRIPTION OF THE DRAWINGS

Example embodiments of the present invention are described below with reference to the figures, and neither the figures nor the description should be construed as limiting the present invention.

The figures are merely schematic and not true to scale. In the figures, identical reference signs refer to identical or identically acting features.

DETAILED DESCRIPTION OF EXAMPLE EMBODIMENTS

Figure 1:
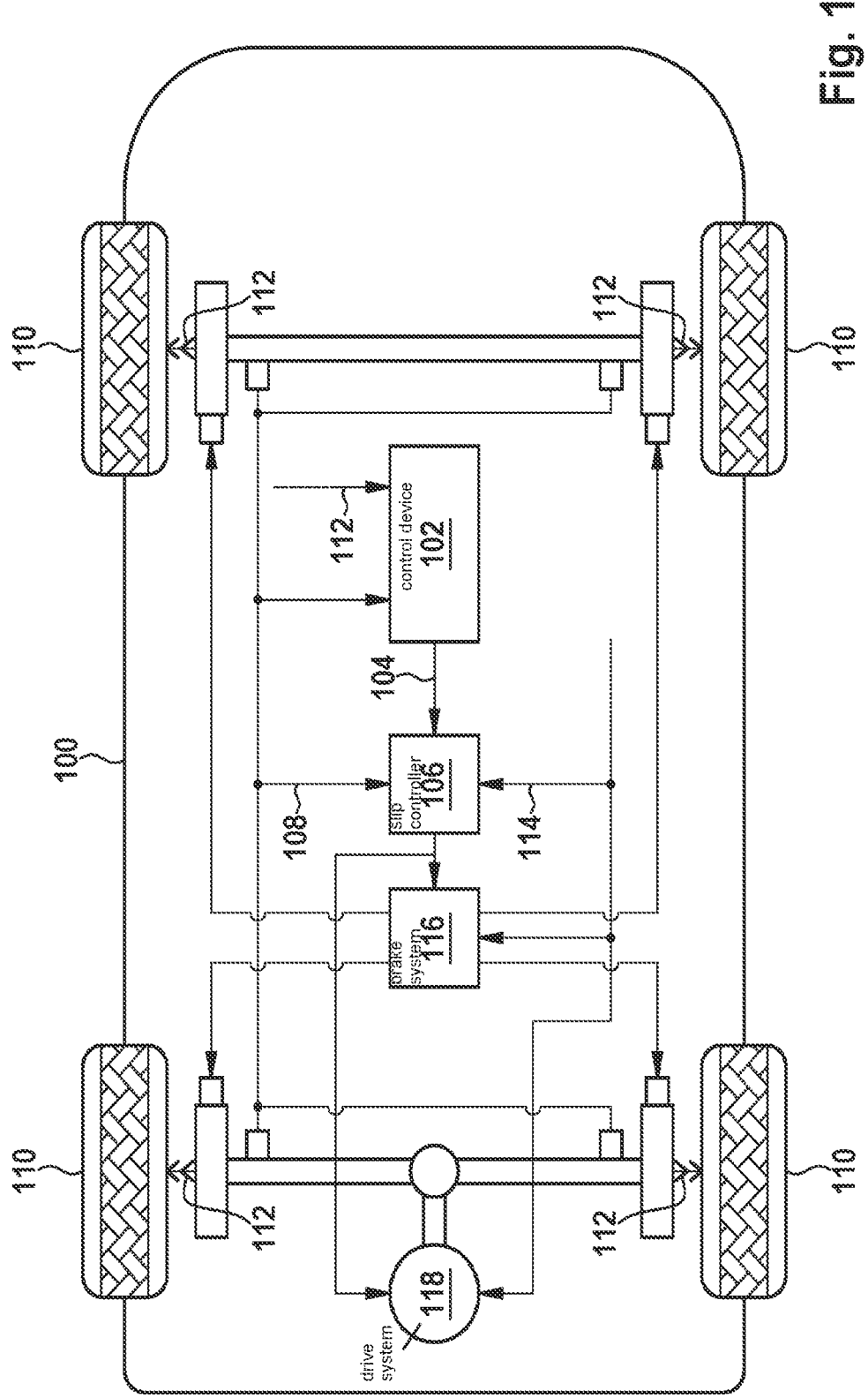
FIG. 1 shows a representation of a vehicle with a control device according to an exemplary embodiment of the present invention.

FIG. 1 shows a representation of a vehicle 100 with a control device 102 according to one exemplary embodiment. The control device 102 is designed to set a working point 104 for a slip controller 106 of the vehicle 100. The slip controller 106 is designed to limit a slip 108 at at least one wheel 110 of the vehicle. To this end, the slip controller 106 reduces a torque 112 at the relevant wheel 110 if a torque demand 114 from another control device or from another function in the same control device of the vehicle 100 or from a driver of the vehicle 100 is too large. To this end, the slip controller 106 can act on a brake system 116 of the vehicle 100 or on a drive system 118 of the vehicle 100. The slip controller 106 becomes active if the torque 112 at at least the one wheel 110 becomes too large for current conditions and the slip 108 at the wheel 110 is greater than a maximum prescribed by the current conditions. The torque 112 can be a braking torque or a drive torque. These differ only by their sign.

The working point 104 is an estimated torque value at which an optimal force transmission between the wheel 110 and the ground should be achieved. The working point 104 thus depends on the current conditions at the wheel 110 or the ground.

The control device 102 reads in the slip 108 and the current torque 112 and monitors a slip curve of the slip 108 and a torque curve of the torque 112. The control device 102 sets the working point 104 on the basis of the slip 108 and the torque 112.

In other words, in the approach presented here, an optimal starting point and working point for a control variable of a controller, for example in an anti-lock braking system (ABS) or traction control system (TCS), is preset. The starting point of the controller designates a value of the control variable at which the control starts.

In this case, the approach is described using the example of the pressure level of the controller of the anti-lock controller (ALC). An anti-lock control (ALC) is a brake pressure control (increase, decrease, and maintain) in order to counteract a locking of the wheels and to shorten the braking distance.

While the controller is active, an estimated optimal pressure for the best possible deceleration is referred to as the working point.

Conventionally, the anti-lock control (ALC) starts at the current pressure level that is calculated at the time of activation of the anti-lock control (ALC). Since an instability of the wheel is already present at this time, this point is not optimally selected. The controller can only determine the optimal working point if the wheel is stabilized. The controller stabilizes the wheel in order to find the optimal pressure level and to set the pressure from there.

In the approach presented here, the pressure starting point is optimized before the wheel instability is detected. As a result, the best possible pressure level can be used as the starting point when the pressure reduction starts, and the pressure can quickly be increased to this point again after the wheel has been stabilized. A long search for the optimal pressure level is omitted.

In the example of the anti-lock control (ALC), the braking distance can thereby be reduced since the anti-lock controller directly sets the optimal slip by means of the correct pressure level and thus achieves the maximum possible deceleration more quickly.

Furthermore, during the active control, the working point is adjusted such that the highest possible performance is achieved. In the case of the anti-lock control (ALC), the greatest possible deceleration of the vehicle is achieved and oscillation due to rapid pressure increases and pressure decreases is prevented.

By means of the approach presented here, the maximum brake pressure is achieved more quickly. The controller thus offers the best possible performance. The control behavior adapts to current conditions (e.g., road, wheels). The wheel dynamics are taken into account in the starting point, as a result of which the control can be predictive. Oscillations due to excessively rapid and partially unnecessary pressure increases and pressure decreases are reduced.

In summary, the approach presented here optimizes the behavior at the beginning of the control (pressure starting point) and during the control (working point) by determining the best possible pressure level for the situation. In the case of the anti-lock control (ALC), this leads to a shortening of the braking distance, a reduction of large pressure increases and decreases (reduction of oscillations), and to a consideration of the wheel dynamics, as a result of which responding to changes is possible at an early stage.

In other controllers, such as the traction control system (TCS), the start-up process can thus be made possible with a better traction. Here too, an estimated working point can have a significantly positive influence on the control behavior.

The working point is the estimated pressure at which the controller can provide the best performance without destabilizing the wheel. The slip and the wheel dynamics can be used to evaluate the best possible performance. In so doing, a defined range for the slip and the wheel dynamics can be referred to as the target zone for the wheel in which the control behavior is optimal.

Since the controller is subject to external influences, the ideal working point cannot be calculated precisely. Measured variables must therefore be used in the system in order to adjust the working point. The dead time of the system can be taken into account when determining the working point. A change in the slip at the time t 1 is due to a change in pressure at the time t 1 minus t dead time of the system. An adjustment of the working point by specific control prevents a long phase in which the controller searches for the optimum of the pressure, and enables a rapid response to strong changes in the environment, such as a significantly smaller coefficient of friction of the ground. Moreover, the optimal pressure level at which the desired slip arises at the wheel can already be estimated when the control is activated.

In principle, the working point can be selected to be too high or too low. In the following, a distinction is made between "select working point lower than the current brake pressure" and "select working point higher than the current brake pressure." For both possibilities, different scenarios in which an adjustment of the pressure level is expedient are described by way of example. The controller attempts to set the pressure of the working point and to maintain it as long as possible in order to achieve the best possible performance.

If, when the controller is active, an inflection point is detected in the slip, i.e., a change from a negative to a positive gradient indicating that the wheel has too much brake pressure and the zone of the optimal slip is therefore left, the pressure starting point or working point of the controller can be selected to be lower than the current brake pressure. Before the inflection point, the wheel was in the range of the optimal slip, which is why this brake pressure is well suited as working point for the controller. The controller "adopts" the pressure at which the wheel was at the optimal slip and regulates to this target instead of taking the current system pressure which would lead to too high a slip of the wheel. If the brake pressure were too high, the wheel would destabilize and a strong control would be required in order to stabilize it again. The previously detected working point helps to keep the wheel as stable as possible and thus to increase the performance of the controller.

If the working point of the controller is too high, i.e., if the slip is increased from below a slip limit to above it, the pressure starting point or working point of the controller can be selected to be lower than the current brake pressure. In the case of the anti-lock control (ALC), a first limit of 7% brake slip has proven to be helpful. Furthermore, it has been shown that an adjustment of the working point when exceeding 13.5%, 17.5%, and 23% slip is expedient. Exceeding these limits requires a lower brake pressure, which, without the changed working point, is only slowly achieved through a pressure decrease.

If during braking, the wheel passes through the pressure level with a stable, effective deceleration (e.g., slip<5% and a<−15) before it becomes unstable, this pressure level can be used as a starting point of the controller. Due to the early detection of the optimal point, the controller regulates directly to the optimal pressure level. Longer pressure increases and pressure decreases can be reduced.

The pressure starting point or working point of the controller can be selected to be higher than the current brake pressure if the slip has risen but starts to decrease and the current system pressure is moreover higher than the working point of the controller. A decreasing slip within the zone of the optimal slip indicates too little brake pressure. This would result in a longer braking distance.

If the slip is in the optimal range, i.e., between zero and five percent in the case of the anti-lock control (ALC), for example, and an inflection point from a rising slip to a falling slip is detected, i.e., the gradient changes from positive to negative, the working point is too low and should be increased. A decreasing slip in the optimal range is an indication that more brake pressure can be built up and the deceleration of the vehicle is thus increased.

In addition, depending on the working point, the dynamics of the control, i.e., the gradient for the pressure increase and pressure decrease, can be adjusted. At a low working point, a lower dynamics, i.e., a slower pressure increase and pressure decrease, is used in order to adjust the pressure. The higher the working point, the stronger the adjustments of the pressure. As a result of the dependence of the dynamics on the working point, it is possible to strongly respond to changed external influences without the fine control close to the working point being prevented.

Furthermore, the working point can be used to wait for the system behavior in the event of strong changes, in order to prevent a premature, incorrect response of the controller. If, for example, the target pressure is already above the working point due to an active pressure increase, the pressure is maintained for a particular time (30 ms in the case of the anti-lock control (ALC), for example) and the change of the slip is monitored. If the slip does not change in the desired direction, the pressure continues to be decreased. However, if the slip already changes strongly, the controller responds thereto and continues to maintain the pressure or can also already counteract if the change in the slip is too large.

The approach presented here can be used in the case of controllers that use the slip as a decisive measured variable, such as the anti-lock controller (ALC) and the traction control system (TCS). The approach can also be transferred to the working point of the engine.

FIGS. 2 to 5 show representations of a setting of the working point 104 according to exemplary embodiments. The setting is effected by a control device, as in FIG. 1. The working point 104 is shown together with the slip 108 and a brake pressure 200 in a diagram in which the time is plotted on the abscissa and different value ranges of the working point 104 of the brake pressure 200 and of the slip 108 are plotted on the ordinate. The working point 104 here is a pressure value which represents a control target for the brake pressure 200.

Figure 2:
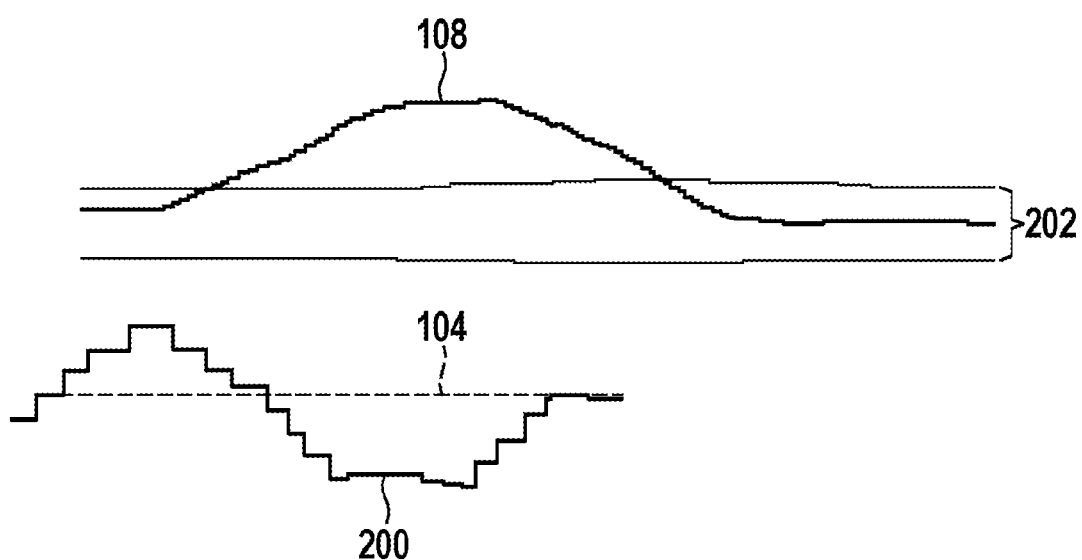
FIGS. 2 to 5 show representations of settings of a working point according to an exemplary embodiment of the present invention.

FIG. 2 shows a target zone 202 of the slip 108 being exceeded by an excessively high torque at the wheel. In this case, a value of the brake pressure 200 at which the slip 108 was in the target zone 202 is selected as the working point 104. The brake pressure 200 is subsequently regulated to the working point 104 so that the torque is again in the target zone 202. The representation is valid both for the starting point before the slip controller is active and for the adjustment of the working point 104 during the control.

Figure 3:
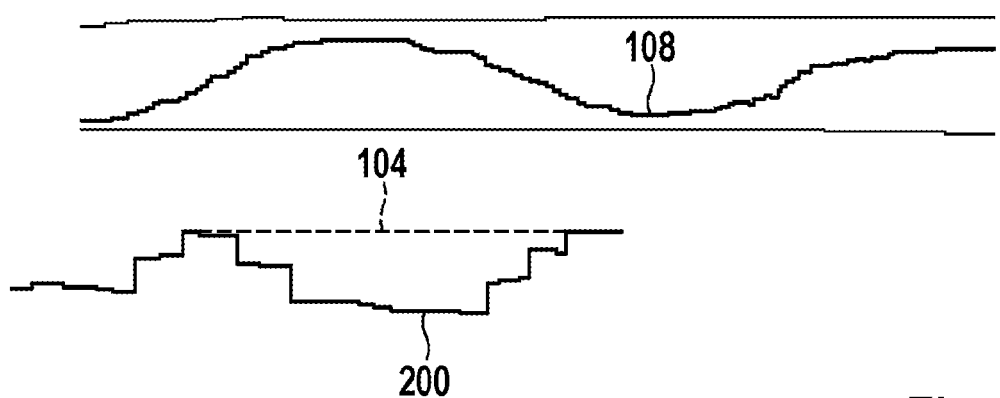

FIG. 3 shows the function of the working point 104 when the torque is in the range of the optimum. The slip controller can compensate for interferences from the environment, such as fluctuations of the coefficient of friction in the ground, without searching for the optimum again. The working point 104 is the target value.

Figure 4:
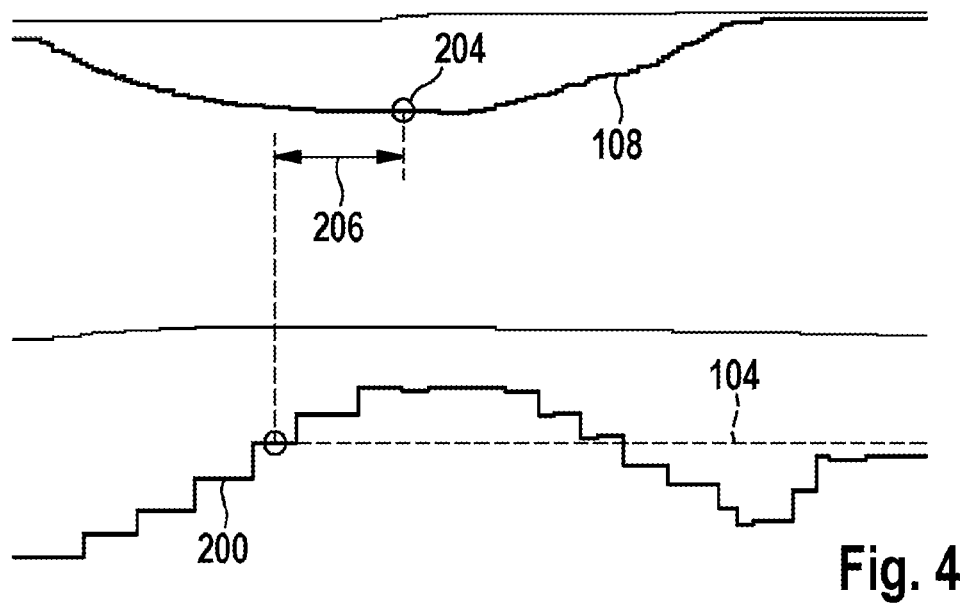

FIG. 4 shows an inflection point 204 of the slip 108 from a negative to a positive gradient. By means of the inflection point 204, the necessary brake pressure 200 can be estimated using the dead time 206 of the system in order to achieve the optimum of the force transmission. To this end, the brake pressure 200 at the time of the inflection point 204 minus the dead time 206 is used as the working point 104 and regulation to this value takes place.

Figure 5:
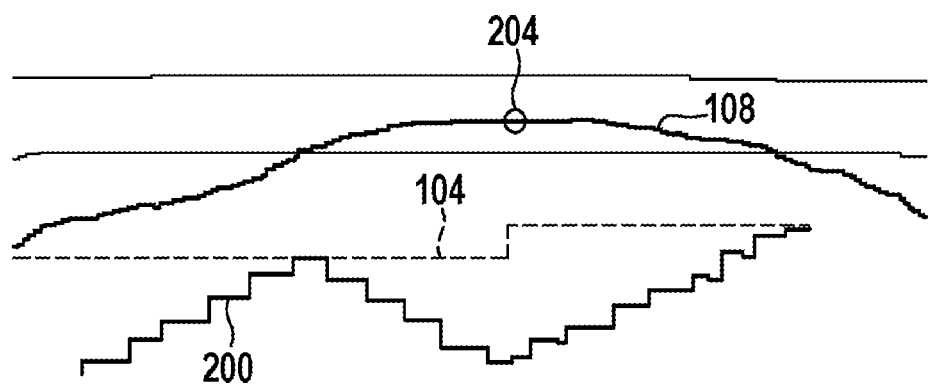

FIG. 5 shows an inflection point 204 of the slip from a positive to a negative gradient before the maximum transmittable torque is achieved. This results in an increase in the working point 104 so that the torque is better adjusted in the next control loop.

Finally, it should be pointed out that terms like "having," "comprising," etc. do not exclude other elements or steps and terms like "a" or "an" do not exclude a plurality.

What is claimed is:

1. A method for setting a working point of a slip controller for a wheel of a vehicle, wherein the activated slip controller controls a torque brought about at the wheel based on the working point, taking into account a currently measured slip between the wheel and a ground, the method comprising the following steps:
   repeatedly monitoring, before and/or during activation of the slip controller, the torque;
   monitoring the slip;
   detecting, while the slip controller is active, an inflection point from a negative gradient to a positive gradient of a time curve of the slip;
   based on the detecting, while the slip controller is active, of the inflection point from the negative gradient to the positive gradient of the time curve of the slip, setting a value of the working point to a temporally previous value of the torque from before a dead time of a brake system of the vehicle or of a drive system of the vehicle; and
   controlling, by the slip controller, the torque brought about at the wheel, based on the set value of the working point.

2. The method according to claim 1, wherein the value of the working point is set to the previous value of the torque when the slip is greater than a predetermined limit value.

3. The method according to claim 1, wherein the value of the torque is detected when the slip is within a predetermined target slip range and a positive or negative acceleration of the vehicle is within a predetermined target acceleration range.

4. The method according to claim 1, wherein the value of the working point is increased by a predefined increment when the slip is within a predetermined target slip range, the torque is above the working point, and an inflection point from a positive to a negative gradient of a curve of the slip is detected.

5. The method according to claim 1, when a gradient of the torque is set proportionally to the working point.

6. The method according to claim 1, wherein the value of the working point is increased by a predefined increment and the torque is kept constant for a predetermined period of time when the torque is above the working point and a gradient of the slip is negative.

7. A control device configured to set a working point of a slip controller for a wheel of a vehicle, wherein the activated slip controller controls a torque brought about at the wheel based on the working point, taking into account a currently measured slip between the wheel and a ground, the control device configured to:
- repeatedly monitor, before and/or during activation of the slip controller, the torque;
- monitor the slip;
- detect, while the slip controller is active, an inflection point from a negative gradient to a positive gradient of a time curve of the slip;
- based on the detecting, while the slip controller is active, of the inflection point from the negative gradient to the positive gradient of the time curve of the slip, set a value of the working point to a temporally previous value of the torque from before a dead time of a brake system of the vehicle or of a drive system of the vehicle;
- wherein the slip controller controls the torque brought about at the wheel, based on the set value of the working point.

8. A non-transitory machine-readable storage medium on which is stored a computer program for setting a working point of a slip controller for a wheel of a vehicle, wherein the activated slip controller controls a torque brought about at the wheel based on the working point, taking into account a currently measured slip between the wheel and a ground, the computer program, when executed by a processor, causing the processor to perform the following steps:
- repeatedly monitoring, before and/or during activation of the slip controller, the torque;
- monitoring the slip;
- detecting, while the slip controller is active, an inflection point from a negative gradient to a positive gradient of a time curve of the slip;
- based on the detecting, while the slip controller is active, of the inflection point from the negative gradient to the positive gradient of the time curve of the slip, setting a value of the working point to a temporally previous value of the torque from before a dead time of a brake system of the vehicle or of a drive system of the vehicle; and
- controlling, using the slip controller, the torque brought about at the wheel, based on the set value of the working point.

\* \* \* \* \*